US 6,915,010 B2

(12) United States Patent
Neubauer et al.

(10) Patent No.: US 6,915,010 B2
(45) Date of Patent: Jul. 5, 2005

(54) REAL TIME OBJECT LOCALIZATION AND RECOGNITION FROM SILHOUETTE IMAGES

(75) Inventors: Claus Neubauer, Monmouth Junction, NJ (US); Ming Fang, Cranbury, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 604 days.

(21) Appl. No.: 09/882,077

(22) Filed: Jun. 15, 2001

(65) Prior Publication Data

US 2002/0191850 A1 Dec. 19, 2002

(51) Int. Cl.[7] ................................................ G06K 9/52
(52) U.S. Cl. ....................................................... 382/206
(58) Field of Search ................................. 382/168, 170, 382/181, 206, 218, 219, 220, 221, 222

(56) References Cited

U.S. PATENT DOCUMENTS

| 3,803,553 A | * | 4/1974 | Nakano et al. .............. 382/206 |
| 5,133,020 A | * | 7/1992 | Giger et al. ................. 382/128 |
| 5,640,468 A | * | 6/1997 | Hsu ............................ 382/190 |

* cited by examiner

Primary Examiner—Jose L. Couso
(74) Attorney, Agent, or Firm—Donald B. Paschburg; F. Chau & Associates, LLC

(57) ABSTRACT

The present invention provides a method for detecting an object. The method includes capturing a binary image of the object, and determining a projection of the binary image to a first axis. The method further includes determining a difference between a profile of a target object to the first axis and the projection at a plurality of positions along the first axis, and detecting the object by determining if the difference between the profile and the projection is less than a threshold at one of the plurality of positions.

21 Claims, 3 Drawing Sheets

REAL TIME OBJECT LOCALIZATION AND RECOGNITION FROM SILHOUETTE IMAGES

BACKGROUND OF THE INVENTION

1. Field of the Invention

The present invention relates to the detection of an object and more particularly to a method for two-dimensional detection and recognition of the object from silhouette images based on multiple projections.

2. Discussion of the Prior Art

Fast two-dimensional (2D) object detection and recognition is needed in many machine vision applications. For example, 2D object detection is often needed to detect, recognize and distinguish objects moving on a conveyor belt.

Where the objects can be characterized and distinguished based on shape, silhouette images obtained through back light illumination offer the possibility to focus merely on the object shape without being influenced by the surfaces of the objects or other reflections. As a result, a binary silhouette (e.g., black/white or 0/1) may be classified. The binary silhouette can be captured using a standard camera or a line scan camera.

Various techniques exist for the classification of silhouette images, for example, geometric moments, Fourier descriptors and Blob analysis. Geometric moments are described by S. X. Liao and M. Pawlak, "On Image-Analysis By Moments", PAMI 18, No. 3, March 1996, pp. 254–266. A discussion of Fourier descriptors can be found in N. Kiryati, "Calculating Geometric Properties of Objects Represent by Fourier Coefficients", CVPR 1988, pp. 641–646. M. O. Shneier described Blob analysis in "Using Pyramids to Define Local Thresholds for Blob Detection", PAMI No. 3, May 1983, pp. 345–349. However, these methods can fail if there are multiple objects within the silhouette, particularly when two or more objects appear to touch.

Therefore, a need exists for a system and method of two-dimensional detection and recognition of an object from silhouette images based on multiple projections.

SUMMARY OF THE INVENTION

The present invention provides a method for detecting an object. The method includes capturing a binary image of the object, and determining a projection of the binary image to a first axis. The method further includes determining a difference between a profile of a target object to the first axis and the projection at a plurality of positions along the first axis, and detecting the object by determining if the difference between the profile and the projection is less than a threshold at one of the plurality of positions.

The method includes determining a projection of the binary image to a second axis prior to determining the position and orientation. The method determines a difference between a profile of the target object to the second axis and the projection of the image to the second axis at a plurality of positions along the second axis, wherein the differences are limited to the position determined along the first axis to have the difference below the threshold, and detects the object upon determining the difference between the profile to the second axis and the projection to the second axis is less than a threshold at one of the plurality of positions. The method includes determining a pixel-by-pixel difference between a binary image of the target object used to determine the profile and the binary image of the object limited to the positions having the differences below the threshold along the first and second axes.

The method comprises determining a pixel-by-pixel difference between a binary image of the target object used to determine the profiles and the binary image of the object limited to the position having the difference below the threshold.

The image includes a plurality of objects. The method is performed for multiple target objects, each target object corresponding to at least one profile. Each profile includes a corresponding orientation of the target object which is defined as the orientation of the object in the image upon detecting the object.

According to an embodiment of the present invention, a method is provided for detecting an object. The method includes illuminating the object from behind as viewed by a camera, capturing an image of the backlight object using the camera, determining a projection to a first axis, and determining a projection to a second axis. The method further includes determining a difference between a profile of a target object to the first axis and the projection to the first axis at a plurality of positions along the first axis, and detecting the object by determining if the difference between the profile to the first axis and the projection to the first axis is less than a threshold at one of the plurality of positions. The method determines a difference between a profile of the target object to the second axis and the projection of the image to the second axis at a plurality of positions along the second axis, wherein the differences are limited to the position determined along the first axis to have the difference below the threshold, and detects the object by determining if the difference between the profile to the second axis and the projection to the second axis is less than a threshold at one of the plurality of positions.

The first axis corresponds to the width of the object. The second axis corresponds to the height of the object. Each profile includes a corresponding orientation of the target object which is defined as the orientation of the object in the image upon detecting the object. The object is determined according to the equation:

$$M_\phi(j) = (\Sigma_i(abs(I(i+j) - P_\phi(i))))/A_\phi$$

where $M_\phi(j)$ is a normalized measure of dissimilarity for a position j, $P_\phi(i)$ is a trained image value, $I(I+j)$ is a projection value for the first axis, and $A_\phi$ is the area under the training profile.

According to one embodiment of the present invention, a program storage device readable by machine is provided, tangibly embodying a program of instructions executable by the machine to perform method steps for detecting an object.

BRIEF DESCRIPTION OF THE DRAWINGS

Preferred embodiments of the present invention will be described below in more detail, with reference to the accompanying drawings.

DETAILED DESCRIPTION OF PREFERRED EMBODIMENTS

The present invention presents a system and method for two-dimensional (2D) detection (localization) and recognition of objects from silhouette images based on multiple projections.

According to an embodiment of the present invention, the method can determine both global and local differences between objects. The method is trained using at least one image (training image) of a target object. After training, the method can detect and recognize an instance of the target object among other objects and can determine position and orientation information.

The method tolerates object rotation within the image plane up to a range. The range can be specified by the user during projections. A fine search in a 2D image can result in a fast inspection procedure, for example, on a personal computer including an Intel Pentium III® 550 MHz processor the method is able to analyze one image (320×240 pixels) within about 5 milliseconds (ms).

Preferably, the object to be detected and recognized is aligned substantially along a known direction, for example, as along a conveyor belt. A projection of a binary image along the x-axis is created, preferably along the direction of object motion in the case of a conveyor belt, in order to localize the object along the x-axis. The projection to the x-axis is computed as, for example, the number of object pixels in a column. The object can be localized in the y-direction based on a projection to the y-axis. Once the position and orientation of the object has been determined, the x and y-projections can be compared with a profile of a 2D binary template image to determine local deviations from the training image. According to an embodiment of the present invention, the method can distinguish and detect multiple objects within an image. For an image including multiple objects, the objects are segmented along the x-axis. Further, by training various types of target objects, the method can distinguish between different types of objects.

Figure 1:
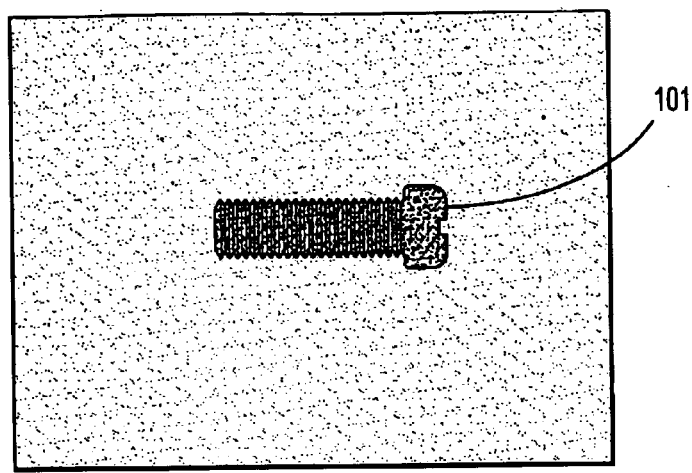
FIG. 1 is an example of a training image according to an embodiment of the present invention.
Figure 2:
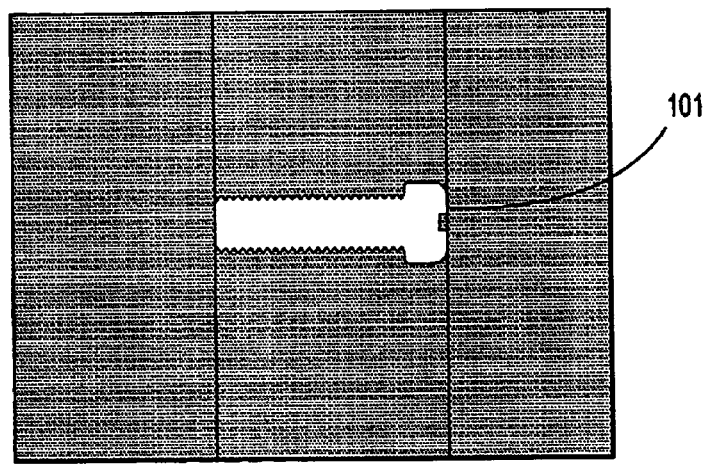
FIG. 2 in an example of a binarized image according to an embodiment of the present invention.
Figure 3:
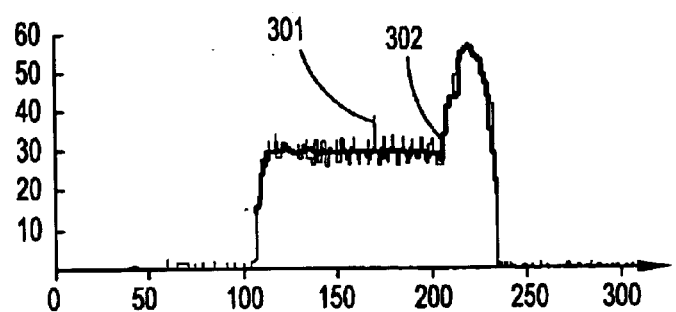
FIG. 3 is a comparison of a trained profile and an actual profile of FIG. 2 according to an embodiment of the present invention.

Referring to FIG. 1, to train a system implementing a method according to the present invention, the object 101 is placed below a camera. Illumination and camera sensitivity may be adjusted to obtain a binary image (black and white) through thresholding. Thresholding sets a value, e.g., 50% brightness, above which all pixels are defined as white and below which all pixels are defined as black. An example of a binary image including the object 101 is shown in FIG. 2. The binary image is projected to the x-axis and a projection is obtained. The projection 301 corresponding to FIG. 2 is shown in FIG. 3. The y-axis projection can be determined using the method for determining the projection to the x-axis.

According to an embodiment of the invention, the system is tolerant of object rotation. The user can specify an angle range that should be tolerated by the system. A set of profiles, for example, in two-degree increments, is computed which covers the range specified, and these profiles are stored for later comparison to a projection of an image.

The object to be recognized has a preferred orientation, which is captured in a training image and at least one corresponding profile. FIG. 3 shows an example of a trained profile 302 overlaid on the image projection 301. During a recognition phase the objects may be rotated in the (x,y) image plane compared to the trained image of the target object due to, for example, handling tolerances. In order to recognize rotated objects, the rotation range is estimated for a particular application (e.g., +/−10 degrees). Rotated profiles of the trained image are generated through the rotation range, for example, with a step size of 2 degrees, resulting in profiles at −10, −8, −6, −4, −2, 0, 2, 4, 6, 8, 10 degrees. x and y-profiles of the target object are computed for each orientation for later comparison with the projection of the image to be analyzed. The rotated profiles may be generated automatically according to an algorithm for shifting pixels, or individually determined using the target object at different rotations. One of ordinary skill in the art would recognize that different step sizes can be used to achieve desirable recognition characteristics, including inter alia, accuracy and speed.

Figure 4:
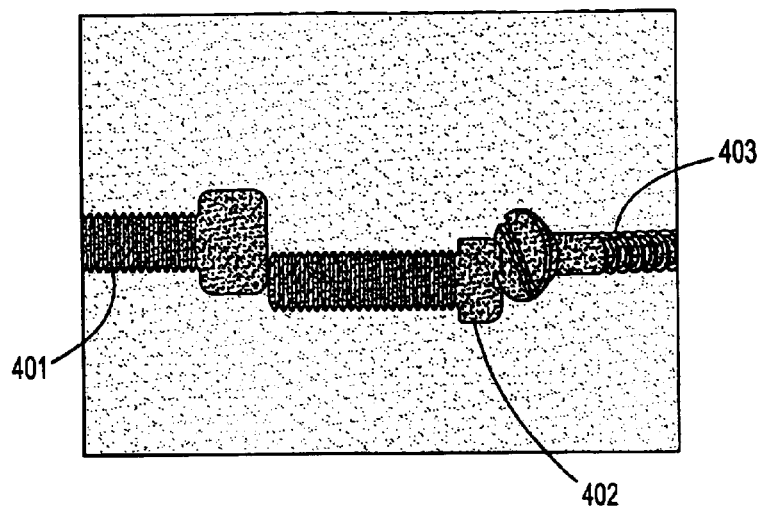
FIG. 4 is an image including several different objects according to an embodiment of the present invention.
Figure 5:
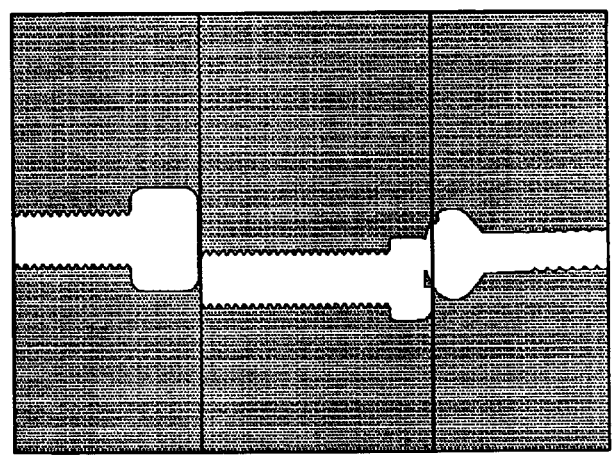
FIG. 5 is a view of FIG. 4 wherein one object has been detected individually according to an embodiment of the present invention.
Figure 6:
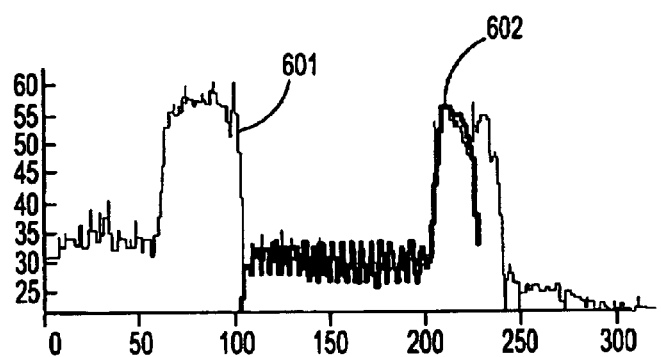
FIG. 6 is a projection to the x-axis and profile for the image of FIG. 4 according to an embodiment of the present invention.

According to an embodiment of the present invention, a method based on projections is described for distinguishing between objects that appear to touch. FIG. 4 is an example of an image including three objects 401–403. For classification, the image is binarized. The binarized image corresponding to FIG. 4 is shown in FIG. 5. A projection to the x-axis is computed, for example, the projection 601 of FIG. 5 is shown in FIG. 6. The trained profiles, e.g., 602, are compared with the x-projection 601, for example, starting from the left side of the image. All of the profiles, e.g., 602, are shifted from left to right (or right to left) along the projection 601. A match between the projection of the image and a profile is determined according to the following rule:

$$M_{100}(j) = (\Sigma_i (abs(I(i+j) - P_\phi(i))))/A_\phi$$

where:

$M_\phi(j)$ is a normalized measure of dissimilarity at position j;

abs( ) is an absolute value;

I is a projection of an image;

i is an index of the projection/profile;

j is a position on the axis;

$P_\phi$ is a trained profile; and $A_\phi$ is the area under the trained profile.

For example, at each position j, along the x-axis, the difference between the trained profile value $P_\phi(i)$ and the projection value of the x-projection $I(i+j)$ is determined. It should be noted that a profile $P_\phi(i)$ may cover a portion of the axis, e.g., profile 602 covers approximately 150 pixels as shown in FIG. 6, and that i gives the length of the profile, e.g., 150 pixels, along the axis (e.g., x, y, or z) starting at any position j. The absolute differences are summed along the length (i) of the trained profile. The resulting sum is divided by the area under trained profile $A_\phi$ to obtain a normalized measure of dissimilarity $M_\phi(j)$.

If $M_\phi(j)$ is less than a threshold, which can be manually adjusted, for example, chosen to be between 0.1 and 0.2 (10 and 20%), then an instance of the target object is detected with one end at position j. For example, as shown in FIG. 6, the object is detected at approximately the $100^{th}$ pixel and extends 150 pixels to the right.

The method can refine the position and the rotation angle by determining $M_\phi(j)$ in the neighborhood of j, e.g., within ten pixels, for each rotation $\phi$ resulting in a set of $M_\phi(j)$ values. The minimum $M_\phi(j)$ amongst a set of $M_\phi(j)$ values is determined to match the projection. FIG. 6 shows the projection to the x-axis 601 and the target profile 602 that best matches the projection of object 402 in the image.

Once an object is recognized, the x-projection of the determined trained object $P_\phi$ is subtracted from the x-projection I of the image and the method is iteratively applied from left to right until all objects are recognized in the image and are subtracted from the projection I. If the image contains only objects of the trained type(s), the resulting x-projection should vanish after subtracting the projections of the objects.

In addition to detecting the known objects in the image, the method can indicate the presence of an unknown object in the view, e.g., for sorting purposes. If the unknown object is in the view, it shows up in the x-projection after subtracting the trained objects. Consequently, a threshold can be applied to the remaining x-projection to detect an unknown object larger than a minimum size and a signal can be created to sort the unknown object out.

If the x-projection is not sufficient to distinguish the trained object from other parts, for example, because the difference is either small or not visible in the x-projection, a second projection of the object in an orthogonal direction (y-projection) can be extracted. The y-projection is preferably extracted during training. If during the recognition phase, an object has been detected (localized) at position j on the x-axis based on the x-projection, a second recognition phase implementing the y-projection and the trained y-profiles determines a best fit along the y-axis. The depth of the search along the y-axis may be limited to the area localized along the x-axis.

The x and the y-profiles result in two one-dimensional functions. The functions describe the location and shape of the object. Thus, a function is obtained describing the vertical height of an object as a function of the x-position. In the same way, the y-projection is obtained by counting the number of object pixels in an image row. Upon determining that the x-projection and the y-projection match at apposition (x,y) and for an orientation $\phi$ the object can be determined to be present.

Figure 7:
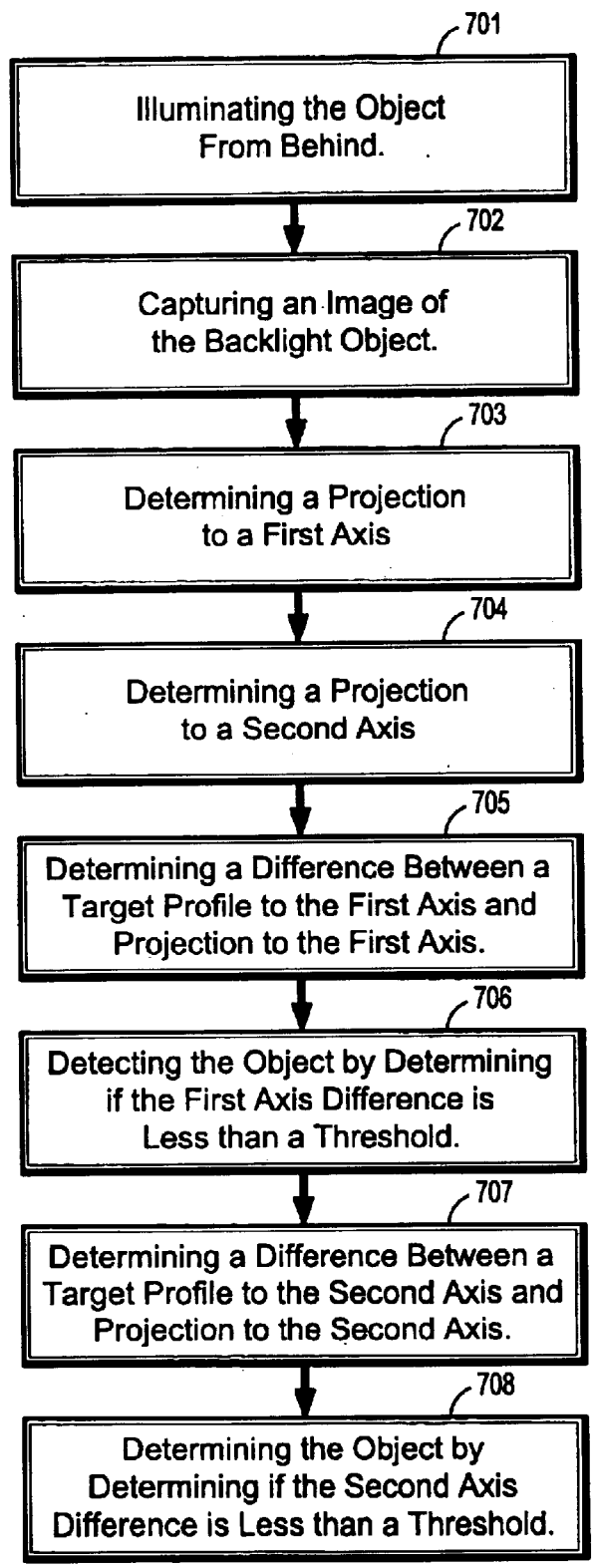
FIG. 7 is a block diagram of a method according to an embodiment of the present invention.

Referring to FIG. 7, in block 701 the method illuminates the object from behind as viewed by a camera, and in block 702 captures an image of the backlight object using the camera. The method determines a projection to a first axis, block 703, determines a projection to a second axis, block 704, and determines a difference between a profile of a target object to the first axis and the projection to the first axis at a plurality of positions along the first axis, block 705. In block 706 the method detects the object upon determining the difference between the profile to the first axis and the projection to the first axis is less than a threshold at one of the plurality of positions. The method determines a difference between a profile of the target object to the second axis and the projection of the image to the second axis at a plurality of positions along the second axis, wherein the differences are limited to the position determined along the first axis to have the difference below the threshold, block 707, and detectes the object upon determining the difference between the profile to the second axis and the projection to the second axis is less than a threshold at one of the plurality of positions, block 708.

To obtain a higher accuracy than provided by the projections alone, the 2D binary template image may be stored during training for each angle. The template corresponds to the position and angle determined during the localization step. The binary template can be compared with the binary image pixel-by-pixel. Thus, small local deviations from the trained model can be detected and the object can be accepted or rejected accordingly.

The proposed method has been tested on a Pentium III® 550 MHz processor and resulted in the following processing times: based on an input image size of 320×240 pixels, the binarization takes 1.5 ms. The profile calculation takes 0.9 ms and the profile comparison takes 1.6 ms. Therefore, recognition based on one projection needs 4.0 ms overall computation time per image, corresponding to 250 objects/sec if on average one object is present in the image. In practice, camera limitations may constrain the method to detection of about 60 objects/sec. The time for the y-axis projection is about 2 ms, assuming for purposes of the present example that the object covers half the width of the image. For a pixel-by-pixel comparison, about 0.5 ms is needed assuming for purpose of the present example that the object covers an area of 150×100 pixels. Therefore, in the high accuracy mode (implementing x and y-projections and a pixel-by-pixel analysis) the processing time is about 6.5 ms per image or 150 objects/sec.

Based on these measurements, it can concluded that the proposed method is well suited for fast online localization and recognition of objects from silhouette images and in addition it can cope with situations where the objects are rotated and/or appear to touch.

Having described embodiments of a system and method for the two-dimensional detection of objects, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claims and desired protected by Letters Patent is set forth in the appended claims.

What is claimed is:

1. A method of detecting an object comprising the steps of:

capturing a binary image of the object;

determining a projection of the binary image to a first axis;

providing a profile of a target object;

determining one of a rotated profile of the profile or a rotated projection of the projection;

determining a difference between the profile of a target object to the first axis and the projection at a plurality of positions along the first axis and at the plurality of positions alone the first axis for each rotated profile or rotated projection; and detecting the object by determining a determined difference between the profile and the projection is less than a threshold at one of the plurality of positions.

2. The method of claim 1, further comprising the step of determining a projection of the binary image to a second axis prior to determining the position and orientation.

3. The method of claim 2, further comprising the steps of:

determining a difference between a profile of the target object to the second axis and the projection of the image to the second axis at a plurality of positions along the second axis, wherein the differences are limited to the position determined along the first axis to have the difference below the threshold; and detecting the object by determining if difference between the profile to the second axis and the projection to the second is less than a threshold at one of the plurality of positions.

4. The method of claim 3, further comprising the step of determining a pixel-by-pixel difference between a binary image of the target object used to determine the profile and the binary image of the object limited to the positions having the differences below the threshold along the first and second axes.

5. The method of claim 1, further comprising the step of determining a pixel-by-pixel difference between a binary image of the target object used to determine the profiles and the binary image of the object limited to the position having the difference below the threshold.

6. The method of claim 1, wherein the image includes a plurality of objects.

7. The method of claims 1, wherein the method is performed for multiple target objects, each target object corresponding to at least one profile.

8. The method of claim 1, wherein each profile includes a corresponding orientation of the target object, corresponding to a rotation of the profile, which is defined as the orientation of the object in the image upon detecting the object.

9. A method of detecting an object comprising the steps of:
   illuminating the object from behind as viewed by a camera;
   capturing an image of the backlight object using the camera;
   determining a projection to a first axis;
   determining a projection to a second axis;
   determining a difference between a profile of a target object to the first axis and the projection to the first axis at a plurality of positions along the first axis;
   detecting the object by determining if the difference between the profile to the first axis and the projection to the first axis is less than a threshold at one of the plurality of positions;
   determining a difference between a profile of the target object to the second axis and the projection of the image to the second axis at a plurality of positions along the second axis, wherein the differences are limited to the position determined along the first axis to have the difference below the threshold; and
   detecting the object by determining if the difference between the profile to the second axis and the projection to the second axis is less than a threshold at one of the plurality of positions.

10. The method of claim 9, wherein the first axis corresponds to the width of the object.

11. The method of claim 9, wherein the second axis corresponds to the height of the object.

12. The method of claim 9, wherein each profile includes a corresponding orientation of the target object which is defined as the orientation of the object in the image upon detecting the object.

13. The method of claim 9, wherein the object is determined according to the equation:

$$M_\phi(j) = (\Sigma_i(abs(I(i+j) - P_\phi(i))))/A_\phi$$

where $M_\phi(j)$ is a normalized measure of dissimilarity for a position j, $P_\phi(i)$ is a trained image value, $I(I+j)$ is a projection value for the first axis, and $A_\phi$ is the area under the training object.

14. A program storage device readable by machine, tangibly embodying a program of instructions executable by the machine to perform method steps for detecting an object, the method steps comprising:
   capturing a binary image of the object;
   determining a projection of the binary image to a first axis;
   providing a profile of a target object;
   determining one of a rotated profile of the profile or a rotated projection of the projection;
   determining a difference between the profile of a target object to the first axis and the projection at a plurality of positions along the first axis and at the plurality of positions along the first axis for each rotated profile or rotated projection; and
   detecting the object by determining a determined difference between the profile and the projection is less than a threshold at one of the plurality of positions.

15. The method of claim 14, further comprising the step of determining a projection of the binary image to a second axis prior to determining the position and orientation.

16. The method of claim 15, further comprising the steps of:
   determining a difference between a profile of the target object to the second axis and the projection of the image to the second axis at a plurality of positions along the second axis, wherein the differences are limited to the position determined along the first axis to have the difference below the threshold; and
   detecting the object upon determining the difference between the profile to the second axis and the projection to the second axis is less than a threshold at one of the plurality of positions.

17. The method of claim 16, further comprising the step of determining a pixel-by-pixel difference between a binary image of the target object used to determine the profile and the binary image of the object limited to the positions having the differences below the threshold along the first and second axes.

18. The method of claim 14, further comprising the step of determining a pixel-by-pixel difference between a binary image of the target object used to determine the profiles and the binary image of the object limited to the position having the difference below the threshold.

19. The method of claim 14, wherein the image includes a plurality of objects.

20. The method of claims 14, wherein the method is performed for multiple target objects, each target object corresponding to at least one profile.

21. The method of claim 14, wherein each profile includes a corresponding orientation of the target object, corresponding to a rotation of the profile, which is defined as the orientation of the object in the image upon detecting the object.

* * * * *